(12) United States Patent
Schneider et al.

(10) Patent No.: US 7,036,788 B1
(45) Date of Patent: May 2, 2006

(54) DIRECTLY CONTROLLED PROPORTIONAL PRESSURE LIMITING VALVE

(75) Inventors: Konrad Schneider, Fellen (DE); Thomas Muller, Steinfeld (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/534,727

(22) PCT Filed: Nov. 12, 2003

(86) PCT No.: PCT/DE03/03740

§ 371 (c)(1),
(2), (4) Date: May 25, 2005

(87) PCT Pub. No.: WO2004/048831

PCT Pub. Date: Jun. 10, 2004

(30) Foreign Application Priority Data

Nov. 28, 2002 (DE) ................................ 102 55 740

(51) Int. Cl.
*F16K 31/02* (2006.01)
(52) U.S. Cl. .................... 251/86; 251/122; 251/129.08; 251/129.15
(58) Field of Classification Search ................. 251/84, 251/86, 122, 129.08, 129.15
See application file for complete search history.

(56) References Cited

U.S. PATENT DOCUMENTS

| 4,027,850 A | 6/1977 | Allen |
| 5,546,987 A | 8/1996 | Sule |
| 5,676,345 A | 10/1997 | Zurke et al. |
| 6,047,947 A * | 4/2000 | Kumar .................. 251/129.16 |
| 6,705,589 B1 * | 3/2004 | Hofmann et al. ...... 251/129.15 |

FOREIGN PATENT DOCUMENTS

| DE | 32 44 840 C2 | 6/1983 |
| DE | 196 25 349 A1 | 1/1998 |
| DE | 199 17 756 A1 | 1/2000 |
| FR | 2 632 045 | 12/1989 |
| WO | WO 00/50794 | 8/2000 |

* cited by examiner

*Primary Examiner*—John Bastianelli
(74) *Attorney, Agent, or Firm*—Oliff & Berridge, PLC

(57) ABSTRACT

A proportionally adjustable pressure limiting valve wherein a valve cone may be actuated via an armature of a proportional solenoid. The valve cone is cardanically supported in the armature. Additional guidance of the valve cone is effected through the intermediary of a housing-side guide, wherein the play between valve cone and housing-side guide is designed to be less than the play between valve cone and armature.

11 Claims, 2 Drawing Sheets

DIRECTLY CONTROLLED PROPORTIONAL PRESSURE LIMITING VALVE

BACKGROUND OF THE INVENTION

The invention relates to a directly controlled and proportionally adjustable pressure limiting valve achieved by the below described embodiments.

The like pressure limiting valves are employed, e.g., as proportionally adjustable pressure limiting valves. In WO 00/50794 A1 a directly controlled pressure limiting valve is disclosed where an armature of a proportional solenoid acts on a valve cone through the intermediary of a tappet. The valve cone is slidingly guided in the valve housing, while the tappet contacting the valve cone is supported in the armature and extends through a guide disc of the valve housing. It is a problem in this solution that in a case of axial offset between the valve seat and the valve cone there is a possibility of the pressure limiting valve not reliably closing any more.

In DE 196 25 349 a solution improved in this respect is proposed, wherein the valve cone is supported directly in the armature. To this end, the armature is provided with a through bore closed on its rear side by a disc on which the valve cone is supported through the intermediary of a sphere. The valve cone is guided in the armature with a certain radial play, so that an axial offset between the armature and the valve cone may be compensated by a slight oblique position of the valve cone.

A similar solution is also disclosed in DE 32 44 840 C2.

SUMMARY OF THE INVENTION

It was, however, found that these variants having a valve body mounted with a play in the armature must also be manufactured and assembled with high precision in order to ensure reliable closure and prevent damage to the valve seat.

In contrast, the invention is based on the object of furnishing a directly controlled proportional pressure limiting valve, wherein a reliable function is ensured at low complexity in terms of manufacture and apparatus.

In accordance with the invention, the valve cone of the pressure limiting valve is cardanically supported on the armature in an axially centered manner, wherein the radial play between the valve cone and the armature is so large that in the event of a movement of the valve cone relative to the armature it will not produce any friction with the latter, and pressure medium may flow largely freely between armature and valve cone. Between the armature and the valve seat a guide means for the valve cone is provided which is secured to the housing and is realized with a radial play that is less than the armature-side radial play.

The expression "cardanic" is to designate a way of supporting the valve cone that permits an oblique position thereof relative to the armature axis.

Such a pressure limiting valve in accordance with the invention on the one hand presents the advantages of the prior art described at the outset, and an axial offset between armature and valve seat is compensated in a simple manner. On the other hand the guide means that is secured to the housing ensures that the valve cone is guided with sufficient accuracy relative to the valve seat, in order to be able to install the valve seat without impact against the valve cone and thus without damage. Another advantage of this solution resides in the fact that thanks to the guide means secured to the housing, a throttle gap for pressure medium flowing into the armature chamber and out of the armature chamber is formed, whereby the movements of the valve cone are damped. Owing to the centered cardanic support of the valve cone on the armature, the radial position of the one end of the valve cone is determined. The other end is centered by the valve seat when the valve is closed, and by the pressure medium flow when the valve is open, whereby it is ensured that the valve cone does not produce any friction against the guide means secured to the housing.

In a preferred variant of the invention, the axial support of the valve cone in the armature is brought about by a sphere which thus forms a kind of omnilateral articulated support and accordingly permits to obliquely position the valve cone in a certain degree.

It is particularly preferred if the support of the valve cone is achieved in the center range of the armature when viewed in the axial direction. Thanks to this measure, the axial offset in the armature relative to the valve cone is minimized when the armature tilts owing to its play in the pole tube.

Supporting the valve cone is particularly simple if an axially extending blind bore is formed in the armature which receives the valve cone in portions thereof. The rear side thereof is then indirectly or directly supported at the bottom of the blind bore.

In order to improve the support by means of a sphere, the bottom of the blind bore and/or the adjacent end face of the valve cone may be provided with—preferably V-shaped—oblique surfaces which tangentially contact the outer circumference of the sphere.

In another advantageous realization, the valve cone has a cylindrical portion that connects to the conical end, whereby the valve cone may be seated on the valve seat. The diameter of the cylindrical portion is determined by the desired maximum diameter of the conical end and extends through the guide means secured to the housing as far as into the armature, so that the cylindrical portion has a suitable length for grinding processing. The blind bore in the armature is stepped so as to be able to readily receive the said portion of the valve cone with radial play in the wider range, and in the narrower range a commercially available sphere, e.g. a ball bearing, in a press-fit. Advantageously the valve cone plunges into the narrower range of the blind bore with a portion thereof having a smaller diameter.

The armature preferably includes one or several throttle bores through which pressure medium may flow between a valve cone-side armature chamber and a rearward armature chamber during the axial translation of the armature.

In an advantageous embodiment, the armature is mounted with the aid of a foil.

The construction of the seat valve is particularly simple if the valve cone is guided floatingly, i.e. freely slidably in the armature. In the solutions named at the outset, the valve cone had always been biased in the opening or closing direction by means of a spring in the armature.

The complexity in terms of apparatus may be further reduced if a centering projection is provided on the rear side of the armature for centering a regulating spring.

Further advantageous developments of the invention are subject matter of further subclaims.

BRIEF DESCRIPTION OF THE DRAWINGS

Hereinafter a preferred embodiment of the invention shall be explained in more detail by referring to schematic drawings, wherein.

DETAILED DESCRIPTION

Figure 1:
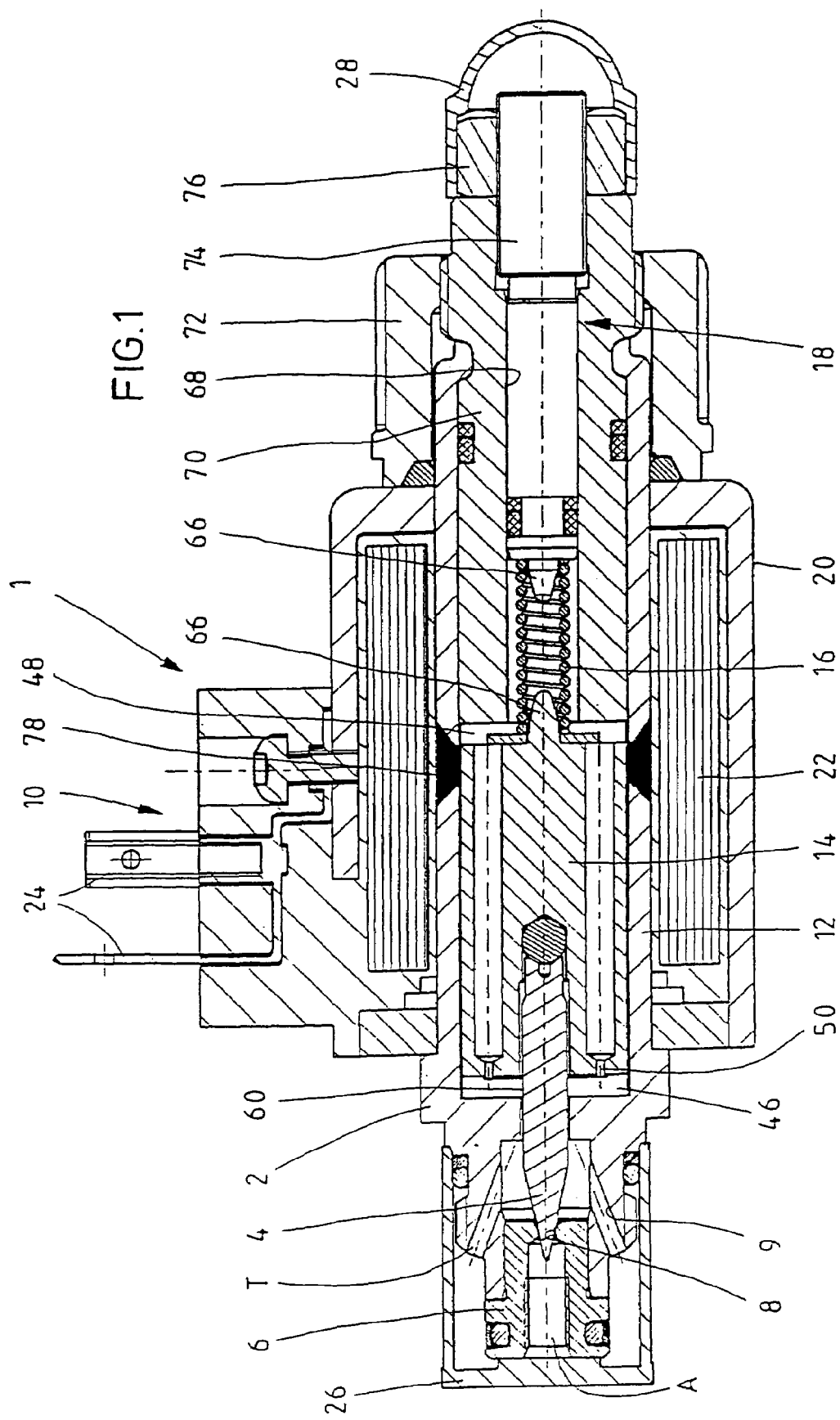
FIG. 1 is a sectional view of a directly controlled pressure limiting valve in accordance with the invention.

In accordance with the longitudinal sectional view represented in FIG. 1, the pressure limiting valve 1 has a valve housing 2 wherein a valve cone 4 is guided so as to be axially displaceable. Into the valve housing 2 a seat body 6 is inserted whereby an axial port A and a valve seat 8 are formed. This seat body 6 may be inserted in the housing by press-fitting, for example. In the valve housing 2 a radial drain or tank port T is formed by a group of oblique bores 9. Actuation of the valve cone 4 takes place with the aid of a proportional solenoid 10 axially mounted on the valve housing 2. The proportional solenoid 10 has a pole tube 12 realized integrally with the valve housing 2, in which an armature 14 is mounted. On the latter the valve cone 8 is supported. The armature 14 is biased in the closing direction of the valve cone 8 through the intermediary of a regulating spring 16. The bias of the regulating spring 16 may be varied by an actuating means 18. The proportional solenoid 10 moreover comprises a coil housing 20 that encompasses the pole tube 12 and in which a magnet coil 22 is received. Electrical supply of the proportional solenoid 10 is performed via connections 24 positioned on top in FIG. 1, that are combined into a terminal body and placed on the coil housing 20.

In the delivered condition, the pressure limiting valve 1 having the form of a cartridge valve is provided with a contact protection cap 26 placed on the valve housing 2 and a protective cap 28 placed on a locknut 76 of the actuating means.

Details of the valve housing shall in the following be explained by referring to the enlarged representation in accordance with FIG. 2.

Accordingly the seat body 6 has an approximately cup-shaped construction, with the valve seat being formed in a bottom 30 of the valve seat 8. Port A is formed by an axial bore 32 of the seat body 6 which opens into the valve seat 8.

The external end face of the bottom 30 defines jointly with a reception bore 34 of the valve housing 2 a tank chamber 36 into which the group of oblique bores 9 (port T) extending to the outer circumferential surface of the valve body 2 opens.

The end face of the reception bore 34 that is removed from the seat body 6 is formed by a housing land 38 penetrated by a guide bore 40 which extends coaxial with the reception bore 34.

In the range of the housing land 38 the pole tube 12 is connected to the valve housing 2. The latter may—like in the described embodiment—be realized integrally with the valve housing 2 or as a separately mounted component.

The armature 14 is guided by its outer circumference in an armature bore 42 of the pole tube 12. In order to reduce the friction between armature 14 and pole tube 12, the inner peripheral wall of the armature bore 42 is lined with a foil 44, for instance of teflon material. This foil 44 forms a sliding bearing for the armature 14, so that the latter may be displaced inside the pole tube 12 with ease. In order to prevent jamming of the armature 14, the latter is guided with a certain play which may, e.g., be 1/10 mm.

The armature 14 divides the reception space of the pole tube 12 (also see FIG. 1) into a valve cone-side armature chamber 46 and a rearward armature chamber 48. These two armature chambers 46, 48 are interconnected by throttle bores 50 that extend in the represented embodiment in parallel with the valve axis through the armature 14.

Figure 2:
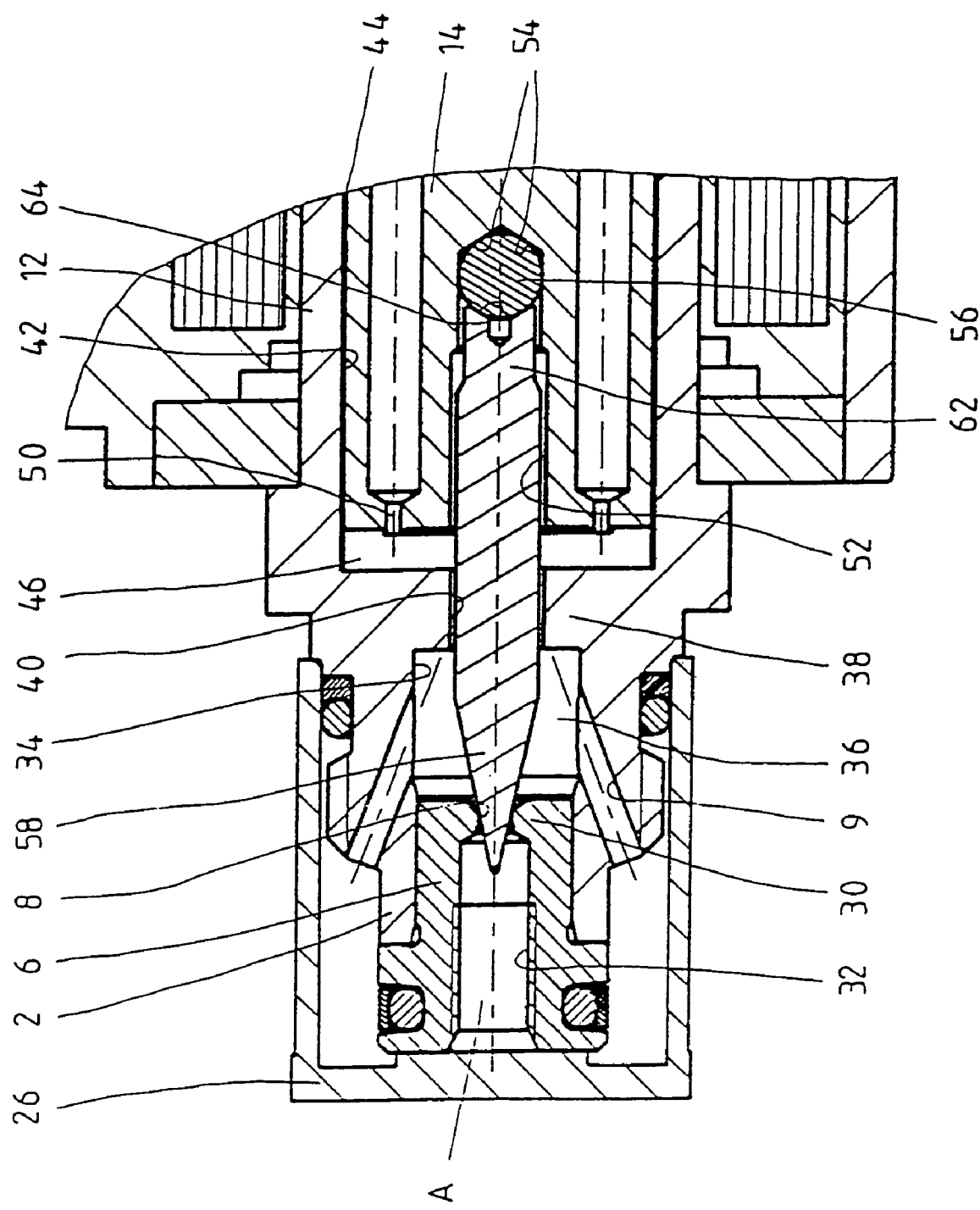
FIG. 2 is a detail representation of the pressure limiting valve of FIG. 1.

The armature has on the valve seat side a blind bore 52 that extends from the left-hand end face of the armature 14 in FIG. 2 to about the axially central range. The bottom of the blind bore 52 is provided with oblique surfaces 54 having a V-shaped configuration on which a sphere 56 is supported. On this sphere 56 in turn the valve cone 4 is supported. In the embodiment represented in FIG. 2, the valve cone 4 has a cone 58 which plunges with portions thereof into the seat body 6 in the represented closed position, and which is seated by an outer circumferential portion on the valve seat 8. To the cone 58 there connects a cylindrical guide portion 60 penetrating through the guide bore 40. An end portion 62 plunging into the armature 14 is stepped back radially, with the outer diameter of this end portion 62 approximately corresponding to the diameter of the sphere 56. In order to reduce the production costs, conventional ball bearings are used for the sphere 56. Such ball bearings are characterized by high strength and good wear resistance.

The contact surface of the end portion 62 on the sphere 56 is also provided with oblique contact surfaces 64. The oblique surfaces 54 and the oblique contact surfaces 64 result in centering of the sphere 56 relative to the blind bore 52, and correspondingly centering of the end portion 62 of the valve cone 4 relative to the sphere 56.

Between the end portion 62 and the inner peripheral bore of the blind bore 52 a certain play is provided which allows for a slightly oblique position of the end portion 62 and thus of the valve cone 4 or of the armature 14. Thanks to this tilt of the valve cone 4 or of the armature 14 it is possible to compensate for an axial offset between the armature 14 and the valve seat 8, with the sphere 56 acting in practice as an articulation bearing around which the valve cone 4 is tilted relative to the armature.

A play is also provided between the guide portion 60 and the inner peripheral wall of the guide bore 40, however this play is smaller than the prescribed play between the end portion 62 and the armature 14. The play in the range of the guide portion 60 is selected such that pressure medium located in the pole tube 12 will in the rest condition not exit through the ring gap between the guide portion 60 and the guide bore 40 and the pole tube run empty, as it were.

In accordance with FIG. 1 a centering projection 66 is formed on the rear side of the armature 14, on which a contact disc is placed, and which serves for centering the regulating spring 16 contacting the contact disc. This regulating spring plunges into the internal bore 68 of a closure member 70 inserted into the pole tube 12. The closure member is positively connected with the pole tube 12, with the connection being established by crimping in the represented embodiment.

Onto the outer periphery of the closure member 70 a securing screw 72 is screwed, whereby the coil housing 20 is axially urged against a shoulder of the valve housing 2.

Into the threaded internal bore 68 a tensioning bolt 74 is screwed whereby the bias of the regulating spring 16 may be adjusted. The spring-side end portion of the tensioning bolt 74 is equally provided with a centering pin 66 for the regulating spring. Onto an end portion of the tensioning bolt 74 protruding from the closure member 70 a locknut 76 is screwed which is taken into contact with the neighboring end face of the closure member 70 for securing the tensioning bolt 74 in position. The protective cap 28 is placed on the locknut 76. Seal members are provided on the outer periphery of the closure member 70 and on the outer periphery of the tensioning bolt 74 in order to seal the pole tube. The pole tube 12 is moreover subdivided by a ring 78 of non-magnetic material.

The above-described construction is characterized by a very simple constructional design with few dead spaces, so that inclusions of air (air cushions) are prevented during filling of the pole tube 12.

For mounting the pressure limiting valve 1, the seat body 6 is press-fitted into the valve housing 2. Prior to this press-fitting the valve cone 4 is already in its represented position. Owing to the comparatively low radial play between the guide portion 60 of the valve cone 4 and the bore 40, the cone tip reliably inserts itself into the seat body 6. The compensation of tolerances between the position of the armature and the position of the seat body is performed due to the radial play between the valve cone 4 and the armature 14 by slight tilting of the valve cone.

In its basic position, the pole tube 12 is completely filled with pressure medium. When the proportional solenoid 10 is energized, the armature is displaced to the right by the engendered magnetic forces against the force of the regulating spring 16, and the valve cone 4 is raised from the valve seat 8 by the pressure acting on port A. The armature 14 and the valve cone 4 assume, in accordance with the force of the regulating spring 16, the magnetic force applied by the proportional solenoid 10, and the acting compressive forces, a control position wherein pressure medium may flow off from port A, via the throttle gap opened in accordance with the armature stroke 14, into the pressure chamber 36 and from there via the group of oblique bores 9 to tank port T. During the axial translation of the armature 14 to the right (against the force of the regulating spring 16), pressure medium located in the rearward armature chamber 48 is displaced via the throttle bores 50 into the armature chamber 46. As the empty volume of this armature chamber 46 is smaller than that of the rearward armature chamber 48, pressure medium must be displaced through the ring gap between the guide portion 60 and the guide bore 40 by the armature chamber 46 into the pressure chamber 36. This throttling in the ring gap brings about damping of the corresponding valve cone movement in the event of pressure changes in armature chambers 46, 48.

When the solenoid valve is de-energized, the armature 14 is again displaced to the left by the force of the regulating spring 16, wherein pressure medium is displaced from the armature chamber 46 via the throttle bores 50 into the rearward armature chamber 48: the valve cone is then correspondingly displaced to the left again until it becomes seated on the valve seat 8, wherein pressure medium is replenished by suction through the above described ring gap.

In the represented embodiment, the pressure limiting valve 1 is designed to be "closed when de-energized". The pressure limiting valve might, of course, also designed to be "open when de-energized", i.e., the valve cone 4 would then be biased in the opening direction in the basic position.

What is disclosed is a proportionally adjustable pressure limiting valve wherein a valve cone may be actuated by means of an armature of a proportional solenoid. The valve cone is cardanically supported in the armature. Additional guidance of the valve cone is effected through the intermediary of a housing-side guide means, wherein the play between valve cone and housing-side guide means is designed to be less than the play between valve cone and armature.

LIST OF REFERENCE SYMBOLS 1 pressure limiting valve
2 valve housing
4 valve cone
6 seat body
8 valve seat
9 group of oblique bores
10 proportional solenoid
12 pole tube
14 armature
16 regulating spring
18 actuating means
20 coil housing
22 magnet coil
24 ports
26 contact protection cap
28 protective cap
30 bottom
32 axial bore
34 reception bore
36 tank chamber
38 housing land
40 guide bore
42 armature bore
44 foil
46 armature chamber
48 rearward armature chamber
50 throttle bore
52 blind bore
54 oblique surfaces
56 sphere
58 cone
60 guide portion
62 end portion
64 contact surface
66 centering pin
68 internal bore
70 closure member
72 securing screw
74 tensioning bolt
76 locknut

What is claimed is:

1. Directly controlled and proportionally adjustable pressure limiting valve having a valve seat formed in a valve housing and a valve cone which define, in a regulating position of the valve cone, a throttle gap whereby an inlet port (A) is connected with an outlet port (T), the valve cone being supported with radial play in a center-mounted armature of a proportional solenoid, characterized by centered cardanic axial support of the valve cone on the armature and by a guide means secured to the housing, that is axially located between the valve seat and the armature for the valve cone and that is formed with less play than the armature-side radial play.

2. The seat valve in accordance with claim 1, wherein the axial support in the armature is effected with the aid of a press-fitted sphere.

3. The seat valve in accordance with claim 1, wherein the axial support is effected in a center range of the armature when viewed in the axial direction.

4. The seat valve in accordance with claim 3, wherein the armature has a blind bore which extends into the center range, and on the bottom of which the valve cone (4) is supported indirectly.

5. The seat valve in accordance with claim 4, wherein the bottom is provided with oblique surfaces.

6. Pressure limiting valve in accordance with claim 1, wherein a blind bore in the armature, into which the valve cone plunges, is stepped, and wherein the sphere is press-fitted in the narrower range of the blind bore, while the other range of the blind bore receives a section of the valve cone that extends with a constant diameter from the armature through the guide means secured to the housing.

7. The seat valve in accordance with claim 2, wherein the valve cone has on the rear side a central end face recess with oblique surfaces that are adapted to be taken into contact with the sphere.

8. The seat valve in accordance with claim 1, wherein the armature is penetrated by at least one throttle bore whereby a valve cone-side armature chamber is connected with a rearward armature chamber.

9. The seat valve in accordance with claim 1, wherein the armature is centrally mounted along its outer circumference through the intermediary of a foil.

10. The seat valve in accordance with claim 1, wherein the valve cone is floatingly received in the armature.

11. The seat valve in accordance with claim 1, wherein the armature has on its rear side a centering pin for a regulating spring.

* * * * *